United States Patent
Montojo et al.

(10) Patent No.: US 8,891,459 B2
(45) Date of Patent: Nov. 18, 2014

(54) SPECTRUM INTERPRETATION IN A HETEROGENOUS NETWORK

(75) Inventors: Juan Montojo, San Diego, CA (US);
Naga Bhushan, San Diego, CA (US);
Wanshi Chen, San Diego, CA (US);
Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 412 days.

(21) Appl. No.: 12/917,242

(22) Filed: Nov. 1, 2010

(65) Prior Publication Data

US 2011/0103330 A1 May 5, 2011

Related U.S. Application Data

(60) Provisional application No. 61/257,199, filed on Nov. 2, 2009.

(51) Int. Cl.
*H04W 4/00* (2009.01)
*H04W 84/04* (2009.01)
*H04W 16/32* (2009.01)
*H04W 72/04* (2009.01)

(52) U.S. Cl.
CPC ........ *H04W 72/0493* (2013.01); *H04W 84/045* (2013.01); *H04W 16/32* (2013.01); *H04W 72/042* (2013.01)
USPC .......................................... 370/329; 455/450

(58) Field of Classification Search
None
See application file for complete search history.

(56) References Cited

U.S. PATENT DOCUMENTS

| 2008/0247375 | A1* | 10/2008 | Muharemovic et al. | 370/344 |
|---|---|---|---|---|
| 2010/0034163 | A1* | 2/2010 | Damnjanovic et al. | 370/329 |
| 2010/0331030 | A1* | 12/2010 | Nory et al. | 455/509 |
| 2011/0002276 | A1* | 1/2011 | Chen et al. | 370/329 |
| 2011/0038331 | A1* | 2/2011 | Chmiel et al. | 370/329 |

FOREIGN PATENT DOCUMENTS

| CN | 101213799 A | 7/2008 |
|---|---|---|
| JP | 2012531810 A | 12/2012 |
| WO | 2010151424 A2 | 12/2010 |

OTHER PUBLICATIONS

International Search Report and Written Opinion—PCT/US2010/055116—International Search Authority, European Patent Office,Feb. 2, 2011.
Motorola: "Heterogeneous Support for Reliable Downlink Control", 3GPP Draft; R1-093416—Heterogeneous Support for Reliable DL Control VFINAL, 3RD Generation Partnership Project (3GPP), no. Shenzhen, China; Aug. 19, 2009, XP050351702.
Motorola: "PDCCH Design for Carrier Aggregation and Post Rei-8 features", 3GPP Draft; R1-093417—Post Rel-8 LTE Control Channel Structure, 3RD Generation Partnership Project (3GPP), Mobile Competence Centre ; 650, Route Des Lucioles ; F-06921 Sophia-Antipolis Cedex ; France, no. Shenzhen, China; Aug. 24, 2009, XP050388131, [retrieved on Aug. 22, 2009].

(Continued)

*Primary Examiner* — Brian Roberts
(74) *Attorney, Agent, or Firm* — François A. Pelaez (57) ABSTRACT

Certain aspects of the present disclosure provide for the application of extension carriers and carrier segments in the context of heterogeneous networks. As described herein, different parts of the spectrum may be interpreted differently by different type of nodes.

52 Claims, 6 Drawing Sheets

(56) References Cited

OTHER PUBLICATIONS

Panasonic: "PDCCH with cross component carrier assignment", 3GPP Draft; R1-093597(Update of R1-093464), 3RD Generation Partnership Project (3GPP), Mobile Competence Centre ; 650, Route Des Lucioles ; F-06921 Sophia-Antipolis Cedex ; France, no. Shenzhen, China; Aug. 24, 2009, XP050388168, [retrieved on Aug. 22, 2009].

Taiwan Search Report—TW099137657—TIPO—Jul. 3, 2013.

* cited by examiner

FIG. 6

SPECTRUM INTERPRETATION IN A HETEROGENOUS NETWORK

CLAIM OF PRIORITY UNDER 35 U.S.C. §119

The present application for patent claims priority to U.S. Provisional Application No. 61/257,199, entitled, "Apparatus and Method For Spectrum Interpretation In a Heterogeneous Network," filed Nov. 2, 2009, and assigned to the assignee hereof and expressly incorporated herein by reference.

BACKGROUND

1. Field of the Invention

The present disclosure relates generally to communication, and more specifically to power control in a multi-carrier wireless communication network.

2. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data to one or more UEs on the downlink and may receive data from one or more UEs on the uplink. On the downlink, a data transmission from the base station may observe interference due to data transmissions from neighbor base stations. On the uplink, a data transmission from a UE may observe interference due to data transmissions from other UEs communicating with the neighbor base stations. For both the downlink and uplink, the interference due to the interfering base stations and the interfering UEs may degrade performance.

SUMMARY

Certain aspects of the present disclosure provide a method for wireless communications in a heterogeneous network of cells of different power class types. The method generally includes allocating, to a first user equipment (UE) in a first cell of a first power class, resources of a first component carrier (CC) for use as a physical downlink shared channel and allocating resources of a first portion of a second CC for use as an extension of the physical downlink shared channel, wherein the resources of the first portion of the second CC do not overlap with resources of a second portion of the second CC allocated as a control region for one or more second UEs in a second cell.

Certain aspects of the present disclosure provide a method for wireless communications in a heterogeneous network of cells of different power class types. The method generally includes receiving, from a base station of a first cell, allocation of resources of a first component carrier (CC) for use as a physical downlink shared channel and receiving, from the base station, allocation of a first portion of a second CC for use as an extension of the physical downlink shared channel, wherein the first portion of the second CC does not overlap with a second portion of the second CC allocated as a control region for one or more UEs of a second cell.

Certain aspects of the present disclosure provide an apparatus for wireless communications in wireless communications network. The apparatus generally includes means for allocating, to a first user equipment (UE) in a first cell of a first power class, resources of a first component carrier (CC) for use as a physical downlink shared channel and means for allocating resources of a first portion of a second CC for use as an extension of the physical downlink shared channel, wherein the resources of the first portion of the second CC do not overlap with resources of a second portion of the second CC allocated as a control region for one or more second UEs in a second cell.

Certain aspects of the present disclosure provide an apparatus for wireless communications in wireless communications network. The apparatus generally includes means for receiving, from a base station of a first cell, allocation of resources of a first component carrier (CC) for use as a physical downlink shared channel and means for receiving, from the base station, allocation of a first portion of a second CC for use as an extension of the physical downlink shared channel, wherein the first portion of the second CC does not overlap with a second portion of the second CC allocated as a control region for one or more UEs of a second cell.

Certain aspects of the present disclosure provide an apparatus for wireless communications in wireless communications network. The apparatus generally includes a scheduling component configured to allocate, to a first user equipment (UE) in a first cell of a first power class, resources of a first component carrier (CC) for use as a physical downlink shared channel and to allocate resources of a first portion of a second CC for use as an extension of the physical downlink shared channel, wherein the resources of the first portion of the second CC do not overlap with resources of a second portion of the second CC allocated as a control region for one or more second UEs in a second cell and a transmitting component configured to transmit data to the first UE on the physical downlink shared channel.

Certain aspects of the present disclosure provide an apparatus for wireless communications in wireless communications network. The apparatus generally includes a scheduling component configured to receive, from a base station of a first cell, allocation of resources of a first component carrier (CC) for use as a physical downlink shared channel and allocation of a first portion of a second CC for use as an extension of the physical downlink shared channel, wherein the first portion of the second CC does not overlap with a second portion of the second CC allocated as a control region for one or more UEs of a second cell and a receiving component configured to receive downlink transmissions from the base station on the physical downlink shared channel.

Certain aspects of the present disclosure provide a computer readable medium having instructions stored thereon, the instructions being executable by one or more processors. The instructions generally include instructions for allocating, to a first user equipment (UE) in a first cell of a first power class, resources of a first component carrier (CC) for use as a physical downlink shared channel and instructions for allocating resources of a first portion of a second CC for use as an extension of the physical downlink shared channel, wherein the resources of the first portion of the second CC do not overlap with resources of a second portion of the second CC allocated as a control region for one or more second UEs in a second cell.

Certain aspects of the present disclosure provide a computer readable medium having instructions stored thereon, the instructions being executable by one or more processors. The instructions generally include instructions for receiving, from a base station of a first cell, allocation of resources of a first component carrier (CC) for use as a physical downlink shared channel and instructions for receiving, from the base station, allocation of a first portion of a second CC for use as an extension of the physical downlink shared channel, wherein the first portion of the second CC does not overlap with a second portion of the second CC allocated as a control region for one or more UEs of a second cell

DETAILED DESCRIPTION

Various aspects are now described with reference to the drawings. In the following description, for purposes of explanation, numerous specific details are set forth in order to provide a thorough understanding of one or more aspects. It will be recognized, however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, an eNodeB (eNB) or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA 2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM).

An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is a recent release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

Single carrier frequency division multiple access (SC-FDMA), which utilizes single carrier modulation and frequency domain equalization has similar performance and essentially the same overall complexity as those of OFDMA system. SC-FDMA signal has lower peak-to-average power ratio (PAPR) because of its inherent single carrier structure. SC-FDMA has drawn great attention, especially in uplink communications where lower PAPR benefits the mobile terminal in terms of transmit power efficiency.

Figure 1:
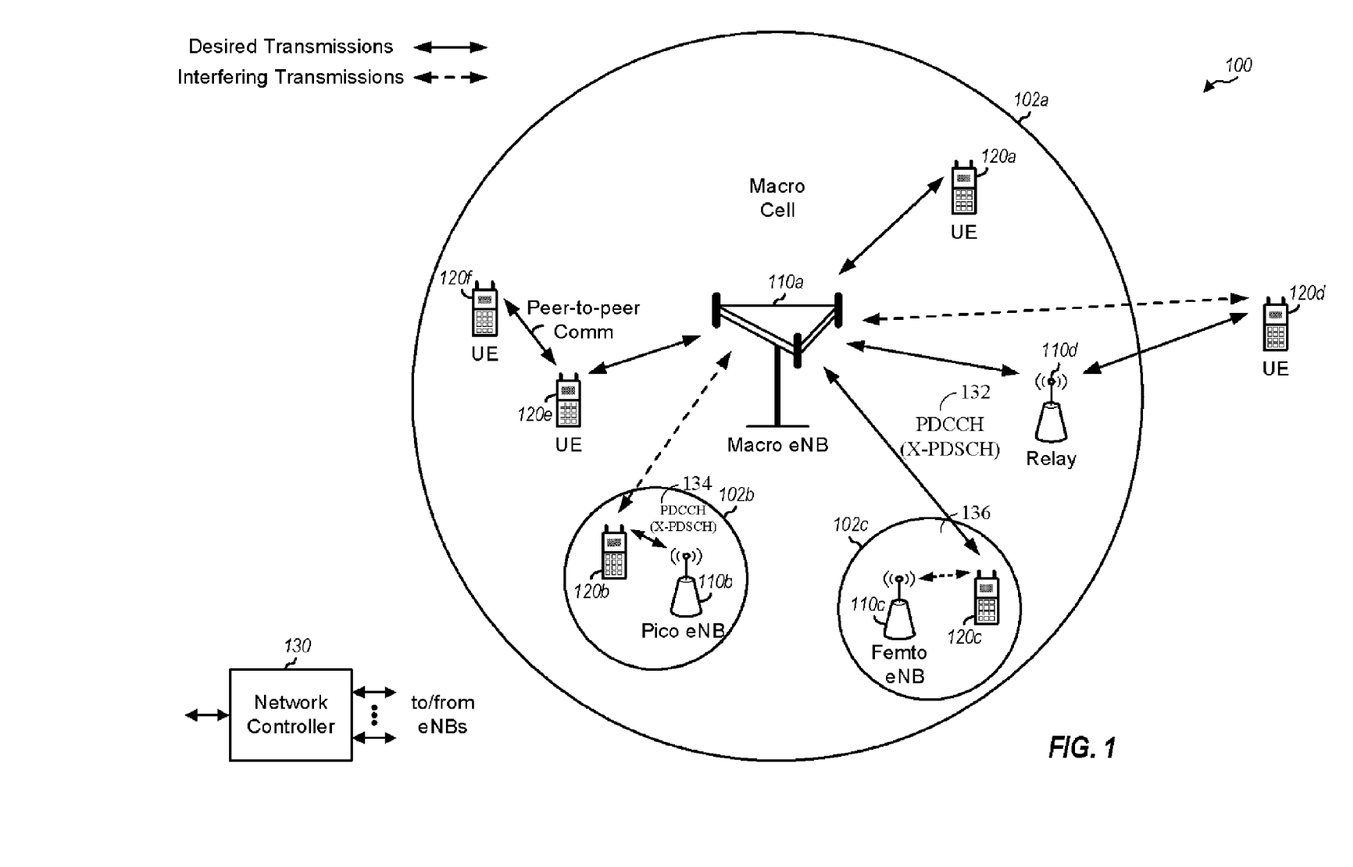
FIG. 1 illustrates an example heterogeneous wireless communications network, in accordance with certain aspects of the present disclosure.

FIG. 1 illustrates an example heterogeneous wireless network 100, in which various aspects of the present disclosure may be practiced.

The wireless communication network 100 may be an LTE network or some other wireless network. Wireless network 100 may include a number of evolved Node Bs (eNBs) 110 and other network entities. An eNB may be an entity that communicates with the UEs and may also be referred to as a base station, a Node B, an access point, etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG)). An eNB for a macro cell may be referred to as a macro eNB. An eNB for a pico cell may be referred to as a pico eNB. An eNB for a femto cell may be referred to as a home eNB (HeNB) or a femto eNB. In the example shown in FIG. 1, an eNB 110a may be a macro eNB for a macro cell 102a, an eNB 110b may be a pico eNB for a pico cell 102b, and an eNB 110c may be a femto eNB for a femto cell 102c. An eNB may support one or multiple (e.g., three) cells. The terms "eNB", "base station", and "cell" may be used interchangeably herein.

Wireless network 100 may also include relays. A relay may be an entity that can receive a transmission of data from an upstream station (e.g., an eNB or a UE) and send a transmission of the data to a downstream station (e.g., a UE or an eNB). A relay may also be a UE that can relay transmissions for other UEs. In the example shown in FIG. 1, a relay 110d may communicate with macro eNB 110a via a backhaul link and with a UE 120d via an access link in order to facilitate communication between eNB 110a and UE 120d. A relay may also be referred to as a relay eNB, a relay station, a relay base station, etc.

Wireless network 100 may be a heterogeneous network that includes eNBs of different types, e.g., macro eNBs, pico eNBs, femto eNBs, relay eNBs, etc. These different types of eNBs may have different transmit power levels, different coverage sizes, and different impact on interference in wireless network 100. For example, macro eNBs may have a high transmit power level (e.g., 5 to 40 Watts) whereas pico eNBs, femto eNBs, and relays may have lower transmit power levels (e.g., 0.1 to 2 Watts).

A network controller 130 may couple to a set of eNBs and may provide coordination and control for these eNBs. Network controller 130 may comprise a single network entity or a collection of network entities. Network controller 130 may communicate with the eNBs via a backhaul. The eNBs may also communicate with one another, e.g., directly or indirectly via a wireless or wireline backhaul.

UEs 120 may be dispersed throughout wireless network 100, and each UE may be stationary or mobile. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a smart phone, a netbook, a smartbook, etc. A UE may be able to communicate with macro eNBs, pico eNBs, femto eNBs, relays, etc. A UE may also be able to communicate peer-to-peer (P2P) with another UE. In the example shown in FIG. 1, UEs 120e and 120f may communicate directly with each other without communicating with an eNB in wireless network 100. P2P communication may reduce the load on wireless network 100 for local communications between UEs. P2P communication between UEs may also allow one UE to act as a relay for another UE, thereby enabling the other UE to connect to an eNB.

In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

A UE may be located within the coverage of multiple eNBs. One of these eNBs may be selected to serve the UE. The serving eNB may be selected based on various criteria such as received signal strength, received signal quality, pathloss, etc. Received signal quality may be quantified by a signal-to-noise-and-interference ratio (SINR), or a reference signal received quality (RSRQ), or some other metric.

A UE may operate in a dominant interference scenario in which the UE may observe high interference from one or more interfering eNBs. A dominant interference scenario may occur due to restricted association. For example, in FIG. 1, UE 120c may be close to femto eNB 110c and may have high received power for eNB 110c. However, UE 120c may not be able to access femto eNB 110c due to restricted association and may then connect to macro eNB 110a with lower received power. UE 120c may then observe high interference from femto eNB 110c on the downlink and may also cause high interference to femto eNB 110c on the uplink.

A dominant interference scenario may also occur due to range extension, which is a scenario in which a UE connects to an eNB with lower pathloss and possibly lower SINR among all eNBs detected by the UE. For example, in FIG. 1, UE 120b may be located closer to pico eNB 110b than macro eNB 110a and may have lower pathloss for pico eNB 110b. However, UE 120b may have lower received power for pico eNB 110b than macro eNB 110a due to a lower transmit power level of pico eNB 110b as compared to macro eNB 110a. Nevertheless, it may be desirable for UE 120b to connect to pico eNB 110b due to the lower pathloss. This may result in less interference to the wireless network for a given data rate for UE 120b.

Various interference management techniques may be used to support communication in a dominant interference scenario. These interference management techniques may include semi-static resource partitioning (which may be referred to as inter-cell interference coordination (ICIC)), dynamic resource allocation, interference cancellation, etc. Semi-static resource partitioning may be performed (e.g., via backhaul negotiation) to allocate resources to different cells. The resources may comprise subframes, subbands, carriers, resource blocks, transmit power, etc. Each cell may be allocated a set of resources that may observe little or no interference from other cells or their UEs. Dynamic resource allocation may also be performed (e.g., via exchange of over-the-air messages between cells and UEs) to allocate resources as needed to support communication for UEs observing strong interference on the downlink and/or uplink. Interference cancellation may also be performed by UEs to mitigate interference from interfering cells.

Wireless network 100 may support hybrid automatic retransmission (HARQ) for data transmission on the downlink and uplink. For HARQ, a transmitter (e.g., an eNB) may send one or more transmissions of a packet until the packet is decoded correctly by a receiver (e.g., a UE) or some other termination condition is encountered. For synchronous HARQ, all transmissions of the packet may be sent in subframes of a single HARQ interlace, which may include every Q-th subframes, where Q may be equal to 4, 6, 8, 10, or some other value. For asynchronous HARQ, each transmission of the packet may be sent in any subframe.

Wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time.

Wireless network 100 may utilize FDD or TDD. For FDD, the downlink and uplink may be allocated separate frequency channels, and downlink transmissions and uplink transmissions may be sent concurrently on the two frequency channels. For TDD, the downlink and uplink may share the same frequency channel, and downlink and uplink transmissions may be sent on the same frequency channel in different time periods.

Spectrum Interpretation in a Heterogeneous Network

As illustrated, according to certain aspects, different eNBs in the heterogeneous wireless network 100 may be configured to "extend" the resources allocated to a physical downlink shared channel (PDSCH) for its UEs via the application of extension carriers and/or carrier segments. As illustrated, macro eNB $110_a$ may allocate resources, via a PDCCH 132, in a manner that extends the PDSCH for a UE $120_c$ by allocating a portion of a component carrier used by UEs served in the Femto cell $102_c$. Similarly, macro eNB $110_b$ may allocate resources, via a PDCCH 134, in a manner that extends the PDSCH for a UE $120_b$ by allocating a portion of a component carrier used by UEs served in the Macro cell $102_a$.

As will be described in greater detail below, the allocation may be done in a manner designed to manage interference between cells. As an example, an eNB of one cell may only allocate a portion of a CC used by another cell (for PDSCH extension of its served UEs) that does not overlap with a portion of that CC allocated as a control region for UEs in the other cell. In this manner, different parts of the available spectrum may be interpreted differently by different type of nodes.

Figure 2:
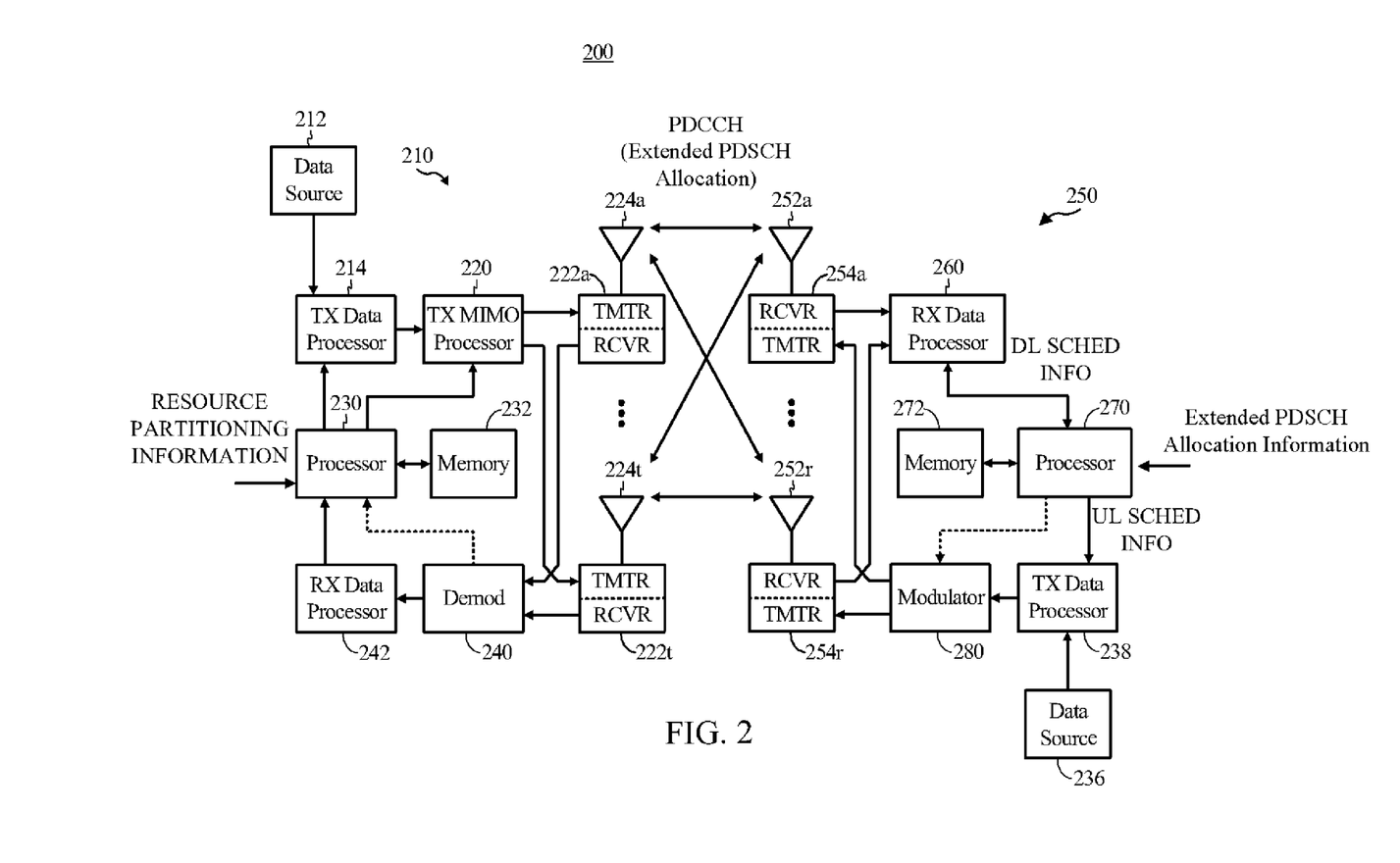
FIG. 2 illustrates a block diagram of example components of an access point and access terminal, in accordance with certain aspects of the present disclosure.

FIG. 2 is a block diagram 200 showing example components of an exemplary base station 210 and access terminal 250 in an example wireless system 200. The base station 210 can be an access point or eNB such as one of the eNBs 110 illustrated in FIG. 1 and the access terminal 250 can be a user equipment such as one of the UEs 120 illustrated in FIG. 1.

At the base station 210, traffic data for a number of data streams is provided from a data source 212 to a transmit (TX) data processor 214. A processor 230 may generate control information to be transmitted to the AT 250. As illustrated, the processor 230 may receive resource partitioning information indicating how different resources are allocated between different cells in a heterogeneous network. The resource partitioning information (RPI) may be received, for example, over a backhaul connection and may be the result of resource negotiations. As such, the RPI may vary over time as negotiations change with varying network conditions. In any case, the processor 230 may utilize this RPI to generate an appropriate PDCCH sent in a downlink transmission to allocate resources to the AT 250 for use as an extended PDSCH.

A TX data processor 214 formats, codes, and interleaves the traffic data for each data stream based on a particular coding scheme selected for that data stream to provide coded data. The coded data for the data streams and control information may be multiplexed with pilot data using OFDM techniques.

The pilot data is typically a known data pattern that is processed in a known manner and may be used at the receiver system to estimate the channel response. The multiplexed pilot and coded data for each data stream is then modulated (e.g., symbol mapped) based on a particular modulation scheme (e.g., Binary Phase Shift Keying (BPSK), Quadrature Phase Shift Keying (QPSK), M-PSK in which M is generally a power of two, or M-QAM (Quadrature Amplitude Modulation)) selected for that data stream to provide modulation symbols. The data rate, coding and modulation for each data stream may be determined by instructions performed by processor 230 that may be coupled with a memory 232.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain aspects, TX MIMO processor 220 applies beamforming weights to the symbols of the data streams and to the antenna from which the symbol is being transmitted.

Transmitters 222 receive and process symbol streams for each downlink component carrier to provide one or more analog signals, and further condition (e.g., amplify filter, and upconvert) the analog signals to provide a modulated signal suitable for transmission over the MIMO channel. $N_T$ modulated signals from transmitters 222a through 222t are then transmitted from $N_T$ antennas 224a through 224t, respectively.

At the access terminal 250, the transmitted modulated signals for the downlink component carriers are received by $N_R$ antennas 252a through 252r and the received signal from each antenna 252 is provided to a respective receiver (RCVR) of the receivers 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves and decodes each detected symbol stream for each configured component carrier to recover the traffic data and control information, including allocation information transmitted in the PDCCH.

The processing by RX data processor 260 may be complementary to that performed by TX MIMO processor 220 and TX data processor 214 at transmitter system 210. A processor 270, coupled to a memory 272, periodically determines which pre-coding matrix to use (discussed below). Processor 270 formulates an uplink message comprising a matrix index portion and a rank value portion.

The processor 270 may receive resource allocation information for an extended PDSCH sent in the PDDCH. The processor 270 may determine which resources to use for the extended PDSCH based on this information.

An uplink (reverse link) message may comprise various types of information regarding the communication link and/or the received data stream. The uplink message may then processed by a TX data processor 238, which also receives traffic data for a number of data streams from a data source 236, modulated by a modulator 280, conditioned by transmitters 254a through 254r.

At transmitter system 210, the uplink transmissions from access terminal 250 are received by antennas 224, conditioned by receivers 222, demodulated by a demodulator 240 and processed by a RX data processor 242 to extract the reserve link message transmitted by the receiver system 250. Processor 230 can then determine various parameters, such as which pre-coding matrix to use for determining beamforming weights, and continue processing the extracted message.

In systems where multi-carrier operation is supported, a UE may be configured to monitor and be served by two or more component carriers (CCs). In such systems, cross-carrier signaling may be supported in an effort to provide for efficient control. This may be particularly desirable in the context of heterogeneous networks—where different types of cells (e.g., macro, pico, and Femto-cells) are overlayed that have access points that transmit with varying levels of power.

There may be different types of CCs, for example, to provide backward compatibility to UEs compatible earlier versions of a standard ("legacy" UEs). Such a combination of CCs may bring not only enhanced UE throughput, but also more efficient interference management especially for heterogeneous networks. As described herein, a portion of resources of a CC (e.g., a carrier segment or extended carrier) may be used to extend the PDSCH of a (non-legacy) UE.

Figure 3:
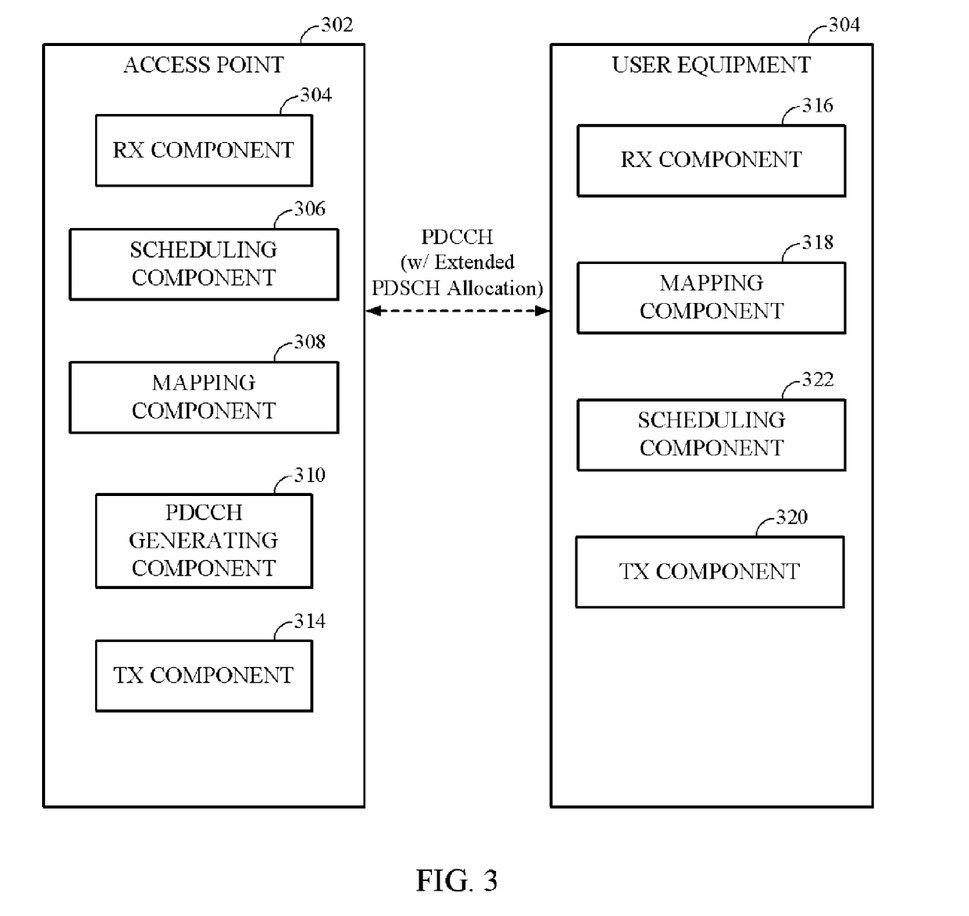
FIG. 3 illustrates example components of a wireless communication system, in accordance with certain aspects of the present disclosure.

FIG. 3 illustrates an example communication system 300 capable of achieving extended PDSCHs. As noted above, this may be achieved by coordinated resource allocation, in which different parts of the available spectrum may be interpreted differently by different type of nodes.

As illustrated, the communication system 300 may comprise an access point 302 and one or more user equipments 304, each of which may be as described in connection with FIGS. 1-2. For multi-carrier operation, the access point 302 may generate allocation information for extending the PDSCH of the UE 304 across multiple carriers and transmit the allocation information to the UE 304 (e.g., in a PDCCH).

According to certain aspects, the access point 302 may send information regarding the mapping of portions of an extended CC region (e.g., a carrier segment or extended carrier) to the UE 304. As an example, this mapping may provide an indication of a starting symbol in the extended region in an effort to avoid interference with a control region allocated to another cell. The start symbol may indicated explicitly (e.g., indicating an actual start symbol which can be done, e.g., by layer 3 configuration or layer 2 dynamic indication) or may be signaled implicitly (e.g., by utilizing the actual control region size obtained via a backhaul information exchange) and the UE may determine the start symbol from this implicit information.

Advantageously, in the presently described embodiment, the start symbol indication may be dynamically updated (e.g., via higher layer signaling), allowing greater flexibility in partitioning resources which may help adapt to various system conditions, for example, allowing for interference management in heterogeneous networks or load balancing.

In one aspect, the access point 302 may include a scheduling component 306 which generates allocation information for resources on one or more component carriers. The scheduling information may be provided to a mapping component 308 that generates a mapping of PDSCH resources to extended resources (a carrier segment or extended carrier). A PDCCH generating component 310 may generate a PDCCH with the allocation information for transmission by a multi-carrier transmitting component 314. The AP 302 may also include a multi-carrier receive component 305 configured to receive uplink transmissions transmitted in accordance with scheduling information transmitted in the PDCCH.

As illustrated, the UE 304 may include components for performing complementary processing to the components shown in the access point 302. For example, the UE 304 may include a multi-carrier RX component 316, a mapping component 318, a scheduling component 322, and a multi-carrier transmitting component 320. The mapping component 318 may receive the allocation information and an indication of a start symbol in an extended carrier region and determine, based on the indication, which resourced to use for an extended PDSCH. The scheduling component 322 may then provide this information to the RX component 316 for use in processing downlink transmissions and to the TX component 320 for use in processing uplink transmissions (e.g., for adjusting transmit power or transmitting HARQ ACK/NACKs).

Figure 4:
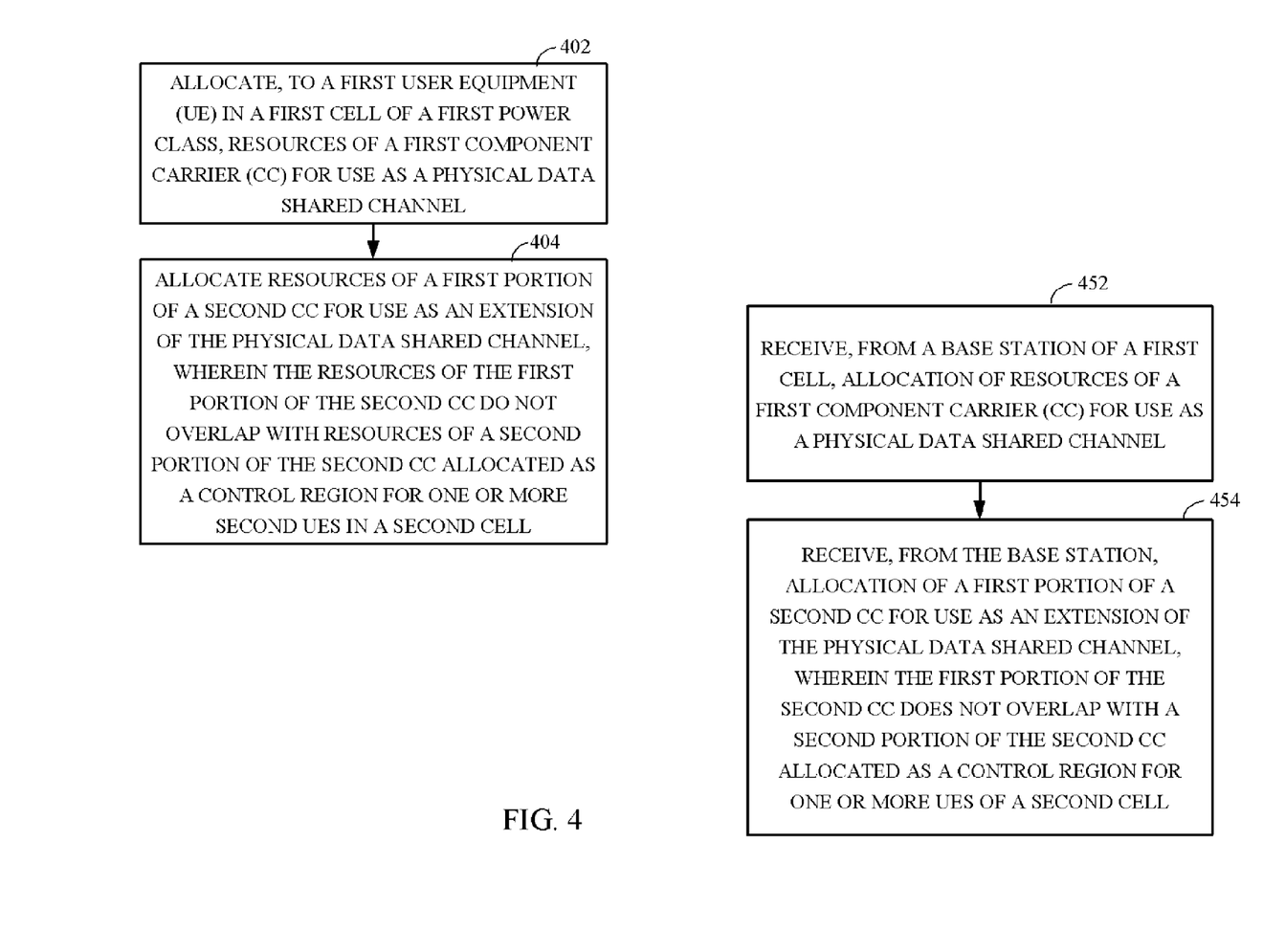
FIG. 4 illustrates example operations for allocating resources, in accordance with certain aspects of the present disclosure.

FIG. 4 illustrates example operations 400 and 450 that may be performed by an access point and user equipment, respectively, for allocating and utilizing an extended PDSCH, in accordance with certain aspects of the present disclosure.

An access point and UE performing the operations may be as described in connection with any of FIGS. 1-3. For instance, exemplary operations 400 may be directed by one or more processors (such as processor 230), or by one or more components (such as components 305-314), while exemplary operations 450 may be directed by one or more processors (such as processor 270), or by one or more components (such as components 316-322).

At 402, the AP allocates, to a first user equipment (UE) in a first cell, resources of a first component carrier (CC) for use as a physical downlink shared channel. At 404, the AP allocates a first portion of a second CC for use as an extension of the physical downlink shared channel, wherein the first portion of the second CC does not overlap with a second portion of the second CC allocated as a control region for one or more second UEs of a second cell. The resources of the first CC and the resources of the first portion of the second CC can be allocated for use by the same first UE. Alternatively, the resources of the first CC and the resources of the first portion of the second CC can be allocated for use by different UEs.

At 452, the UE receives, from a base station of a first cell of a first power class type, allocation of resources of a first component carrier (CC) for use as a physical downlink shared channel. At 454, the UE or a different UE receives, from the base station, allocation of a first portion of a second CC for use as an extension of the physical downlink shared channel, wherein the first portion of the second CC does not overlap with a second portion of the second CC allocated as a control region for one or more UEs of a second cell of a second power class type.

As noted above, the allocation of resources for the PDSCH (including the extended portion) may be signaled in the PDCCH sent in the first CC. The PDSCH may be extended with resources outside the first CC.

For example, in various systems, such as LTE "Advanced" (LTE-A), carrier aggregation enables the aggregation of contiguous or non-contiguous spectrum for UEs to have access to corresponding PHY resources. Resource allocation from one carrier to another carrier may be enabled. As an example, it can be enabled via the use of an agreed-upon carrier indicator field (CIF) embedded in the PDCCH. As another example, it can be enabled by treating the carriers in aggregation as one carrier in terms of resource assignment, especially in the case of carrier extensions detailed below.

In order to extend PDSCH, different mechanisms outside a primary CC may be used, such as carrier extension (segments) and extension carriers. As used herein, the term carrier segments generally refers to segments that are defined as bandwidth extensions of an existing (e.g., LTE Rel-8 compatible) component carrier (which is typically no larger than 110 RBs in total). A carrier segment may allow utilization of frequency resources in case new transmission bandwidths are needed in a backwards compatible way complementing carrier aggregation means. This mechanism may reduce additional PDCCH transmissions that would be required in a carrier aggregation setting and also reduce the use of small TB sizes for the part corresponding to the segment. Thus, a carrier segment may allow aggregating additional resource blocks to a component carrier, while still retaining the backward compatibility of the original carrier bandwidth. Carrier segments may be defined as always adjacent and linked to one component carrier (and not used "stand-alone"). Carrier segments may also be limited in their use, for example, not providing synchronization signals, system information, or paging.

Figure 5:
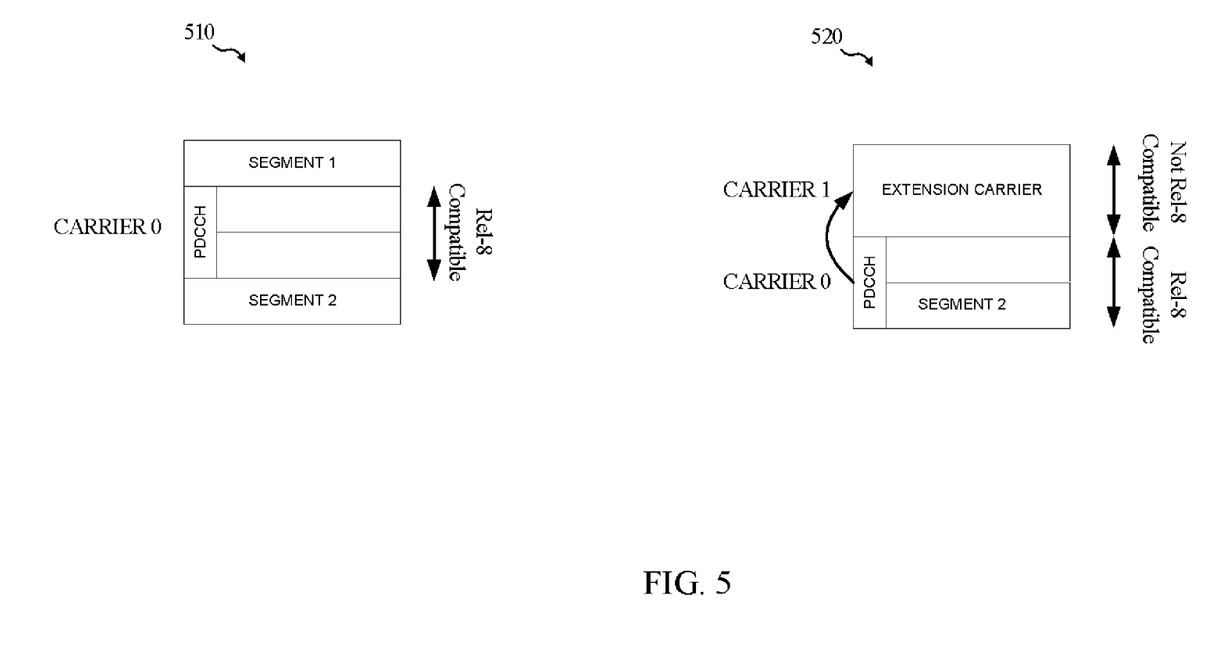
FIG. 5 illustrates examples of a carrier segment and extension carrier, in accordance with certain aspects of the present disclosure.

Diagram 510 in FIG. 5 illustrates example carrier segments (Segment 1 and Segment 2) adjacent to a component carrier (Carrier 0), illustratively backward-compatible with LTE Rel. 8. As noted, the segments are an extension of the CC and, thus, the CC with extension(s) may be considered a single HARQ entity. Allocation of one or more of the extensions for use in extending the PDSCH may be made in the PDCCH in Carrier 0.

Extension carriers may be designed with a similar philosophy as carrier segments. However, an extension carrier may be an actual component carrier itself, which may or may not be backward compatible (with Rel-8 UEs). The backward compatible carrier and the extension carrier, being two different component carriers, may assume independent H-ARQ processes and transport blocks.

Diagram 520 in FIG. 5 illustrates example extension carrier (Carrier 1) linked to a backward-compatible component carrier (Carrier 0). As noted, the extension carrier may be an actual component carrier and, thus, may be treated as an independent HARQ entity. Again, allocation of the extension carrier for use in extending the PDSCH may be made in the PDCCH in Carrier 0.

As shown in FIG. 5, extension carriers and carrier segments may be linked to a backward compatible component carrier and, in some cases, may not be used in a stand-alone manner. Use of the extension carriers and/or segments may be limited to prohibit their use for conveying synchronization signals, system information, paging for UEs, and various control channels, such as Rel-8 PDCCH, Rel-8 PHICH, and Rel-8 PCFICH. Further, these extension mechanisms may be prohibited for use in random access or UE camping. Extension carriers and segments may not recognized and/or accessible by LTE Rel 8 ("legacy") UEs.

The use of these carrier aggregation mechanisms in heterogeneous networks (HetNets) proposed herein may allow semi-static partitioning of spectrum for high power nodes (e.g., macro UEs) and low power nodes (e.g., femto/pico nodes UEs). According to certain aspects, extension carriers and carrier segments may be suitable for interference management for HetNets. In this case, different portions of the spectrum may be interpreted differently by different type of nodes.

Figure 6:
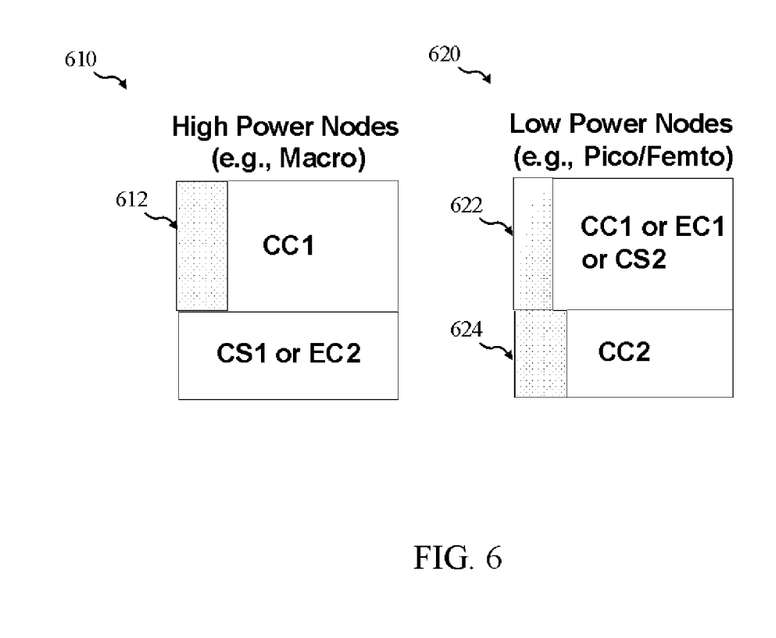
FIG. 6 illustrates examples of extended physical downlink shared channel resources, in accordance with certain aspects of the present disclosure.

For example, as illustrated in the resource diagram 610 of FIG. 6, an extended PDSCH for a high power node may comprise one backward compatible carrier (CC1) and an extended PDSCH region comprising at least one carrier segment (CS1) or extension carrier (EC2) which may be of a second component carrier (CC2). According to certain aspects, legacy UEs (e.g., Rel-8 or older) may be served within CC1 only, while non-legacy UEs (Rel-9 or higher) may be served by both CC1 and CS1/EC2. As illustrated, however, the allocation of resources in CS1/EC2 may be via the control region 612 in CC1.

According to certain aspects, the "extended PDSCH" may be mapped to resources in CS1 in various manners, such as starting from a first OFDM symbol or starting from a later OFDM symbol in an effort to avoid high power node data interfering with low power node control interference (since legacy control is used in CC2 by low power nodes). According to certain aspects, the starting OFDM symbol may be conveyed by CC1 to the UE (dynamically or semi-statically).

It should be noted that the diagram 610 in FIG. 6 represents an example interpretation of available spectrum from the perspective of a high power node. Diagram 650, on the other hand, represents an example interpretation of the same spectrum from the perspective of a low power node. As illustrated, from the perspective of the low power node, the extended PDSCH may include one backward compatible carrier (CC2), and extension carrier(s) EC1 or carrier segment(s) CS2 or a component carrier (CC1). In this example, CC2, being backward compatible, carries the control region, and can signal the resources for EC1/CS2/CC1. The mapping of PDSCH in EC1/CS2/CC1 in this case assigned from CC2 starts from an OFDM symbol conveyed by CC2 to the UE (or at a fixed OFDM symbol). In this example, EC1/CS2 does not carry control region, rather CC1 carries the regular control channel.

As illustrated above, with this arrangement, different parts of the spectrum may be interpreted differently by different type of node. In general, high power nodes and low power nodes may be arranged such that low power nodes using CC2 is free of interference in the control region, if the high power nodes do not transmit in the symbols using CS1 or EC2 colliding with the control region of the lower nodes using CC2.

By sharing resource partitioning information (e.g., via backhaul connections), node Bs may be able to schedule resources in this manner to avoidance interference between the control region 624 (e.g., corresponding to control region of the high power node) and an extended PDSCH of the high power node. Interference avoidance may be done, for example, by mapping PDSCH starting from the 4th symbol (large system bandwidths), or 5th symbol (small system bandwidth), or by utilizing the actual control region size of CC2 (via backhaul information exchange) and conveying it to the UE. UEs subject to range expansion under lower power nodes may be served using CC2. On the other hand, in-coverage UEs under lower power nodes (i.e., UEs see the lower power nodes with the best DL signal) can be served by both CC2 and EC1/CS2/CC1.

The present disclosure provides for the application of extension carriers and carrier segments in the context of heterogeneous networks. As described herein, different parts of the spectrum may be interpreted differently by different type of nodes.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk and Blu-ray® disc where disks usually reproduce data magnetically, while discs reproduce data optically with lasers.

For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method for wireless communications in a wireless communications network, comprising:
    allocating, to a first user equipment in a first cell of a first power class, resources of a first component carrier for use as a physical downlink shared channel; and
    allocating resources of a first portion of a second component carrier for use as an extension of the physical downlink shared channel based on resource partitioning information shared between the first cell and a second cell, wherein the resources of the first portion of the second component carrier do not overlap with resources of a second portion of the second component carrier allocated as a control region for one or more second user equipments in the second cell, and wherein paging is prohibited in the extension.

2. The method of claim 1, wherein the resources of the first component carrier and the resources of the first portion of the second component carrier are allocated for use by different user equipments.

3. The method of claim 1, wherein the wireless communications network comprises a heterogeneous network and the first and second cells comprise cells of different power class types.

4. The method of claim 1, wherein the first portion of second component carrier comprises a carrier segment adjacent the first component carrier.

5. The method of claim 1, wherein the second component carrier comprises an extension carrier.

6. The method of claim 1, further comprising conveying, to the first user equipment, an indication of a location of the first portion of the second component carrier.

7. The method of claim 6, wherein conveying the indication comprises:
    sending, using the first component carrier, the first user equipment an indication of a starting symbol of the first portion of the second component carrier.

8. The method of claim 7, wherein the indication of the starting symbol is determined based on a size of the second portion of the second component carrier used as a control region for one or more second user equipments.

9. The method of claim 1, wherein the first portion of the second component carrier begins at a fixed location known to the first user equipment.

10. The method of claim 1, wherein:
    the first user equipment comprises a user equipment capable of communicating with a first or later version of a wireless communications standard; and
    the second user equipment comprises a user equipment capable of communicating with a second version of the standard earlier than the first version.

11. The method of claim 1, wherein:
    the second cell comprises a lower power class type than the first cell.

12. The method of claim 11, wherein:
    the second component carrier comprises at least one of an extension carrier or a carrier segment.

13. A method for wireless communications in a wireless communications network, comprising:
    receiving, from a base station of a first cell, allocation of resources of a first component carrier for use as a physical downlink shared channel; and
    receiving, from the base station, allocation of a first portion of a second component carrier for use as an extension of the physical downlink shared channel based on resource partitioning information shared between the first cell and a second cell, wherein the first portion of the second component carrier does not overlap with a second portion of the second component carrier allocated as a control region for one or more user equipments of the second cell, and wherein paging is prohibited in the extension.

14. The method of claim 13, wherein the resources of the first component carrier and the resources of the first portion of the second component carrier are allocated for use by different user equipments.

15. The method of claim 13, wherein the wireless communications network comprises a heterogeneous network and the first and second cells comprise cells of different power class types.

16. The method of claim 13, wherein the first portion of second component carrier comprises a carrier segment adjacent the first component carrier.

17. The method of claim 13, wherein the second component carrier comprises an extension carrier.

18. The method of claim 13, further comprising receiving, from the base station, an indication of a location of the first portion of the second component carrier.

19. The method of claim 18, wherein receiving the indication comprises:
receiving, using the first component carrier, an indication of a starting symbol of the first portion of the second component carrier.

20. The method of claim 19, wherein the indication of the starting symbol is determined based on a size of the second portion of the second component carrier used as a control region for one or more user equipments.

21. The method of claim 13, wherein the first portion of the second component carrier begins at a fixed location.

22. The method of claim 13, wherein:
the first component carrier is used to communicate with user equipments capable of communicating with a first or later version of a wireless communications standard; and
the second component carrier is used to communicate with user equipments capable of communicating with a second version of the standard earlier than the first version.

23. The method of claim 13, wherein:
the second cell comprises a lower power class type than the first cell.

24. The method of claim 23, wherein:
the second component carrier comprises at least one of an extension carrier or a carrier segment.

25. An apparatus for wireless communications in a wireless communications network, comprising:
means for allocating, to a first user equipment in a first cell of a first power class, resources of a first component carrier for use as a physical downlink shared channel, and
means for allocating resources of a first portion of a second component carrier for use as an extension of the physical downlink shared channel based on resource partitioning information shared between the first cell and a second cell, wherein the resources of the first portion of the second component carrier do not overlap with resources of a second portion of the second component carrier allocated as a control region for one or more second user equipments in the second cell, and wherein paging is prohibited in the extension; and
means for transmitting data to the first user equipment on the physical downlink shared channel.

26. The apparatus of claim 25, wherein the resources of the first component carrier and the resources of the first portion of the second component carrier are allocated for use by different user equipments.

27. The apparatus of claim 25, wherein the wireless communications network comprises a heterogeneous network and the first and second cells comprise cells of different power class types.

28. The apparatus of claim 25, wherein the first portion of second component carrier comprises a carrier segment adjacent the first component carrier.

29. The apparatus of claim 25, wherein the second component carrier comprises an extension carrier.

30. The apparatus of claim 25, wherein the means for transmitting is further configured to convey, to the first user equipment, an indication of a location of the first portion of the second component carrier.

31. The apparatus of claim 30, wherein the means for transmitting is configured to:
send, using the first component carrier, the first user equipment an indication of a starting symbol of the first portion of the second component carrier.

32. The apparatus of claim 31, wherein the indication of the starting symbol is determined based on a size of the second portion of the second component carrier used as a control region for one or more second user equipments.

33. The apparatus of claim 25, wherein the first portion of the second component carrier begins at a fixed location known to the first user equipment.

34. The apparatus of claim 25, wherein:
the first user equipment comprises a user equipment capable of communicating with a first or later version of a wireless communications standard; and
the second user equipment comprises a user equipment capable of communicating with a second version of the standard earlier than the first version.

35. The apparatus of claim 25, wherein:
the second cell comprises a lower power class type than the first cell.

36. The apparatus of claim 35, wherein:
the second component carrier comprises at least one of an extension carrier or a carrier segment.

37. An apparatus for wireless communications in a wireless communications network, comprising:
means for receiving, from a base station of a first cell, allocation of resources of a first component carrier for use as a physical downlink shared channel, and
means for receiving, from the base station, allocation of a first portion of a second component carrier for use as an extension of the physical downlink shared channel based on resource partitioning information shared between the first cell and a second cell, wherein the first portion of the second component carrier does not overlap with a second portion of the second component carrier allocated as a control region for one or more user equipments of the second cell, and wherein paging is prohibited in the extension; and
means for receiving downlink transmissions from the base station on the physical downlink shared channel.

38. The apparatus of claim 37, wherein the resources of the first component carrier and the resources of the first portion of the second component carrier are allocated for use by different user equipments.

39. The apparatus of claim 37, wherein the wireless communications network comprises a heterogeneous network and the first and second cells comprise cells of different power class types.

40. The apparatus of claim 37, wherein the first portion of second component carrier comprises a carrier segment adjacent the first component carrier.

41. The apparatus of claim 37, wherein the second component carrier comprises an extension carrier.

42. The apparatus of claim 37, wherein the means for receiving the downlink transmissions is further configured to receive, from the base station, an indication of a location of the first portion of the second component carrier.

43. The apparatus of claim 42, wherein the means for receiving the downlink transmissions is configured to:
receive, using the first component carrier, an indication of a starting symbol of the first portion of the second component carrier.

44. The apparatus of claim 43, wherein the indication of the starting symbol is determined based on a size of the second portion of the second component carrier used as a control region for one or more user equipments.

45. The apparatus of claim 37, wherein the first portion of the second component carrier begins at a fixed location.

46. The apparatus of claim 37, wherein:
the first component carrier is used to communicate with user equipments capable of communicating with a first or later version of a wireless communications standard; and
the second component carrier is used to communicate with user equipments capable of communicating with a second version of the standard earlier than the first version.

47. The apparatus of claim 37, wherein:
the second cell comprises a lower power class type than the first cell.

48. The apparatus of claim 47, wherein:
the second component carrier comprises at least one of an extension carrier or a carrier segment.

49. An apparatus for wireless communications in a wireless communications network, comprising:
a scheduling component comprising hardware, the scheduling component being configured to allocate, to a first user equipment in a first cell of a first power class, resources of a first component carrier for use as a physical downlink shared channel and to allocate resources of a first portion of a second component carrier for use as an extension of the physical downlink shared channel based on resource partitioning information shared between the first cell and a second cell, wherein the resources of the first portion of the second component carrier do not overlap with resources of a second portion of the second component carrier allocated as a control region for one or more second user equipments in the second cell, and wherein paging is prohibited in the extension; and
a transmitter configured to transmit data to the first user equipment on the physical downlink shared channel.

50. An apparatus for wireless communications in a wireless communications network, comprising:
a scheduling component comprising hardware, the scheduling component being configured to receive, from a base station of a first cell, allocation of resources of a first component carrier for use as a physical downlink shared channel and allocation of a first portion of a second component carrier for use as an extension of the physical downlink shared channel based on resource partitioning information shared between the first cell and a second cell, wherein the first portion of the second component carrier does not overlap with a second portion of the second component carrier allocated as a control region for one or more user equipments of the second cell, and wherein paging is prohibited in the extension; and
a receiver configured to receive downlink transmissions from the base station on the physical downlink shared channel.

51. A computer-program product for wireless communications, comprising a non-transitory computer readable medium having instructions stored thereon, the instructions being executable by one or more processors and the instructions comprising:
instructions for allocating, to a first user equipment in a first cell of a first power class, resources of a first component carrier for use as a physical downlink shared channel; and
instructions for allocating resources of a first portion of a second component carrier for use as an extension of the physical downlink shared channel based on resource partitioning information shared between the first cell and a second cell, wherein the resources of the first portion of the second component carrier do not overlap with resources of a second portion of the second component carrier allocated as a control region for one or more second user equipments in the second cell, and wherein paging is prohibited in the extension.

52. A computer-program product for wireless communications, comprising a non-transitory computer readable medium having instructions stored thereon, the instructions being executable by one or more processors and the instructions comprising:
instructions for receiving, from a base station of a first cell, allocation of resources of a first component carrier for use as a physical downlink shared channel; and
instructions for receiving, from the base station, allocation of a first portion of a second component carrier for use as an extension of the physical downlink shared channel based on resource partitioning information shared between the first cell and a second cell, wherein the first portion of the second component carrier does not overlap with a second portion of the second component carrier allocated as a control region for one or more user equipments of the second cell, and wherein paging is prohibited in the extension.

* * * * *